(12) United States Patent
Awata et al.

(10) Patent No.: US 8,130,401 B2
(45) Date of Patent: Mar. 6, 2012

(54) IMAGE FORMING SYSTEM, DATA PROCESSOR AND DATA PROCESSING METHOD

(75) Inventors: Yoshinori Awata, Kawasaki (JP);
Yoshihiro Ohshima, Kawasaki (JP);
Yukiharu Inoue, Kawasaki (JP);
Kazuya Hashimoto, Kawasaki (JP);
Fumio Takatani, Kawasaki (JP);
Yasuaki Mitobe, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1010 days.

(21) Appl. No.: 12/059,122

(22) Filed: Mar. 31, 2008

(65) Prior Publication Data
US 2009/0073466 A1 Mar. 19, 2009

(30) Foreign Application Priority Data

Sep. 18, 2007 (JP) .................................. 2007-241413

(51) Int. Cl.
*G06F 15/00* (2006.01)
*G06F 3/12* (2006.01)
*G06K 1/00* (2006.01)
*H04N 1/60* (2006.01)

(52) U.S. Cl. ........................................ 358/1.15; 358/1.9

(58) Field of Classification Search ........................ None
See application file for complete search history.

(56) References Cited

U.S. PATENT DOCUMENTS
6,515,762 B2 * 2/2003 Noguchi .................... 358/1.9

FOREIGN PATENT DOCUMENTS
| JP | 10-116166 A | 5/1998 |
| JP | 2004-287520 A | 10/2004 |
| JP | 2005-018495 A | 1/2005 |

OTHER PUBLICATIONS

Japanese Office Action for Japanese Patent Application 2007-241413 dated Sep. 1, 2009.

* cited by examiner

*Primary Examiner* — Douglas Tran
(74) *Attorney, Agent, or Firm* — Sughrue Mion, PLLC (57) ABSTRACT

The image forming system is provided with: a printer that superposes and transfers plural images formed by use of plural image forming materials to a medium; and a data processor that supplies data of the images to the printer. The data processor includes: a data generation unit that generates data of image components corresponding to the respective kinds of the image forming materials; a data forwarding unit that forwards the generated data to the printer; and an assigning unit that assigns the image components in accordance with the data amount of the forwarded data. The printer includes: an output controller that controls an image forming mechanism to form an image by use of the image forming materials; and a switch processing unit that transmits the data received from the data processor, to the output controller corresponding to the image components of the received data.

10 Claims, 9 Drawing Sheets

| | | DATA SIZE BEFORE COMPRESSION | COMPRESSION RATE | DATA SIZE AFTER COMPRESSION | NUMBER OF PAGES STORED IN PAGE MEMORY (512MB) | STORAGE CAPACITY OF PAGE MEMORY |
|---|---|---|---|---|---|---|
| IF BOARD 120a | Y | 32MB | 1/5 | 6.4MB | 40 PAGES | /512MB |
| | M | 32MB | 1/5 | 6.4MB | 40 PAGES | |
| IF BOARD 120b | C | 32MB | 1/5 | 6.4MB | 40 PAGES | /512MB |
| | K | 32MB | 1/5 | 6.4MB | 40 PAGES | |

FIG.2B

| | | DATA SIZE BEFORE COMPRESSION | COMPRESSION RATE | DATA SIZE AFTER COMPRESSION | NUMBER OF PAGES STORED IN PAGE MEMORY (512MB) | STORAGE CAPACITY OF PAGE MEMORY |
|---|---|---|---|---|---|---|
| IF BOARD 120a | Y | 32MB | 7/10 | 22.4MB | 10 PAGES | /512MB |
| | M | 32MB | 9/10 | 28.8MB | 10 PAGES | |
| IF BOARD 120b | C | 32MB | 3/10 | 9.6MB | 40 PAGES | /512MB |
| | K | 32MB | 1/10 | 3.2MB | 40 PAGES | |

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Y: DATA | 20 | 15 | 25 | 19 | 30 | 29 | 28 | 30 | 30 | 29 | 20 | 22 | 30 | 25 | 21 | 27 | 26 | 18 | 19 | 13 |
| Y: CUMULATIVE VALUE | 20 | 35 | 60 | 79 | 109 | 138 | 166 | 196 | 226 | 255 | 275 | 297 | 327 | 352 | 373 | 400 | 426 | 444 | 452 | 465 |

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| M: DATA | 10 | 30 | 28 | 20 | 15 | 28 | 30 | 20 | 25 | 28 | 10 | 5 | 24 | 18 | 29 | 7 | 19 | 26 | 14 | 6 |
| M: CUMULATIVE VALUE | 10 | 40 | 68 | 88 | 103 | 131 | 161 | 181 | 206 | 234 | 244 | 249 | 273 | 291 | 320 | 327 | 346 | 372 | 386 | 392 |

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| C: DATA | 10 | 5 | 3 | 20 | 30 | 10 | 4 | 1 | 15 | 11 | 20 | 22 | 29 | 10 | 18 | 15 | 11 | 5 | 4 | 13 |
| C: CUMULATIVE VALUE | 10 | 15 | 18 | 38 | 68 | 78 | 82 | 83 | 98 | 109 | 129 | 151 | 180 | 190 | 208 | 223 | 234 | 239 | 243 | 256 |

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| K: DATA | 5 | 20 | 10 | 21 | 12 | 30 | 4 | 18 | 21 | 25 | 9 | 17 | 30 | 27 | 28 | 7 | 6 | 14 | 3 | 18 |
| K: CUMULATIVE VALUE | 5 | 25 | 30 | 51 | 63 | 93 | 97 | 115 | 136 | 161 | 170 | 187 | 217 | 244 | 272 | 279 | 285 | 299 | 302 | 320 |

FIG.5

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| YM: CUMULATIVE VALUE | 30 | 75 | 128 | 167 | 212 | 269 | 327 | 377 | 432 | 489 | 519 | 546 | 600 | 643 | 693 | 727 | 772 | 816 | 838 | 857 |
| CK: CUMULATIVE VALUE | 15 | 35 | 48 | 89 | 131 | 171 | 179 | 198 | 234 | 270 | 299 | 338 | 397 | 434 | 480 | 502 | 519 | 538 | 545 | 576 |

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| YC: CUMULATIVE VALUE | 30 | 50 | 78 | 117 | 177 | 216 | 248 | 279 | 324 | 364 | 404 | 448 | 507 | 542 | 581 | 623 | 660 | 683 | 695 | 721 |
| MK: CUMULATIVE VALUE | 15 | 60 | 98 | 139 | 166 | 224 | 258 | 296 | 342 | 395 | 414 | 436 | 490 | 535 | 592 | 606 | 631 | 671 | 688 | 712 |

| PAGE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| YK: CUMULATIVE VALUE | 25 | 55 | 90 | 130 | 172 | 231 | 263 | 311 | 362 | 416 | 445 | 484 | 544 | 596 | 645 | 679 | 711 | 743 | 754 | 785 |
| MC: CUMULATIVE VALUE | 20 | 55 | 86 | 126 | 171 | 209 | 243 | 264 | 304 | 343 | 373 | 400 | 453 | 481 | 528 | 550 | 580 | 611 | 629 | 648 |

FIG.9

IMAGE FORMING SYSTEM, DATA PROCESSOR AND DATA PROCESSING METHOD

CROSS REFERENCE TO RELATED APPLICATIONS

This application is based on and claims priority under 35 USC §119 from Japanese Patent Application No. 2007-241413 filed Sep. 18, 2007.

BACKGROUND

1. Technical Field

The present invention relates to an image forming system including a printer that forms an image on a medium such as a paper sheet and a data processor that provides data to the printer, and a data processing method.

2. Related Art

An image forming system including a printer and a data processor as separate units is generally employed for digital color printing. The printer forms an image on a medium such as paper, and the data processor supplies data to the printer. In this type of system, single-color images (image components with colors and an image component with black) of yellow (Y), magenta (M), cyan (C), black (K) and the like are formed, and a full-color image is formed by superimposing the single-color images on one another. Accordingly, an image forming unit (so-called printer engine) is provided for each color in the printer, and the data processor supplies the image forming units of the respective colors with image data of corresponding images.

SUMMARY

According to an aspect of the invention, there is provided an image forming system including: a printer that transfers plural images to a medium while superposing the plural images formed by use of plural image forming materials on one another; and a data processor that supplies data of the images to the printer. The data processor includes: a data generation unit that generates data of image components corresponding to the respective kinds of the image forming materials; plural data forwarding units that forward the generated data to the printer; and an assigning unit that assigns the image components of the data to be forwarded to the plural data forwarding units respectively in accordance with the data. The printer includes: output controllers that each controls an image forming mechanism to form an image by use of the image forming materials; and a switch processing unit that transmits the data received from the data forwarding unit of the data processor, to one of the output controllers corresponding to the respective kinds of image components of the data.

BRIEF DESCRIPTION OF THE DRAWINGS

Exemplary embodiment (s) of the present invention will be described in detail based on the following figures, wherein.

DETAILED DESCRIPTION

Hereinafter, a detailed description will be provided for an exemplary embodiment of the present invention with reference to the accompanying drawings.

<System Configuration>

Figure 1:
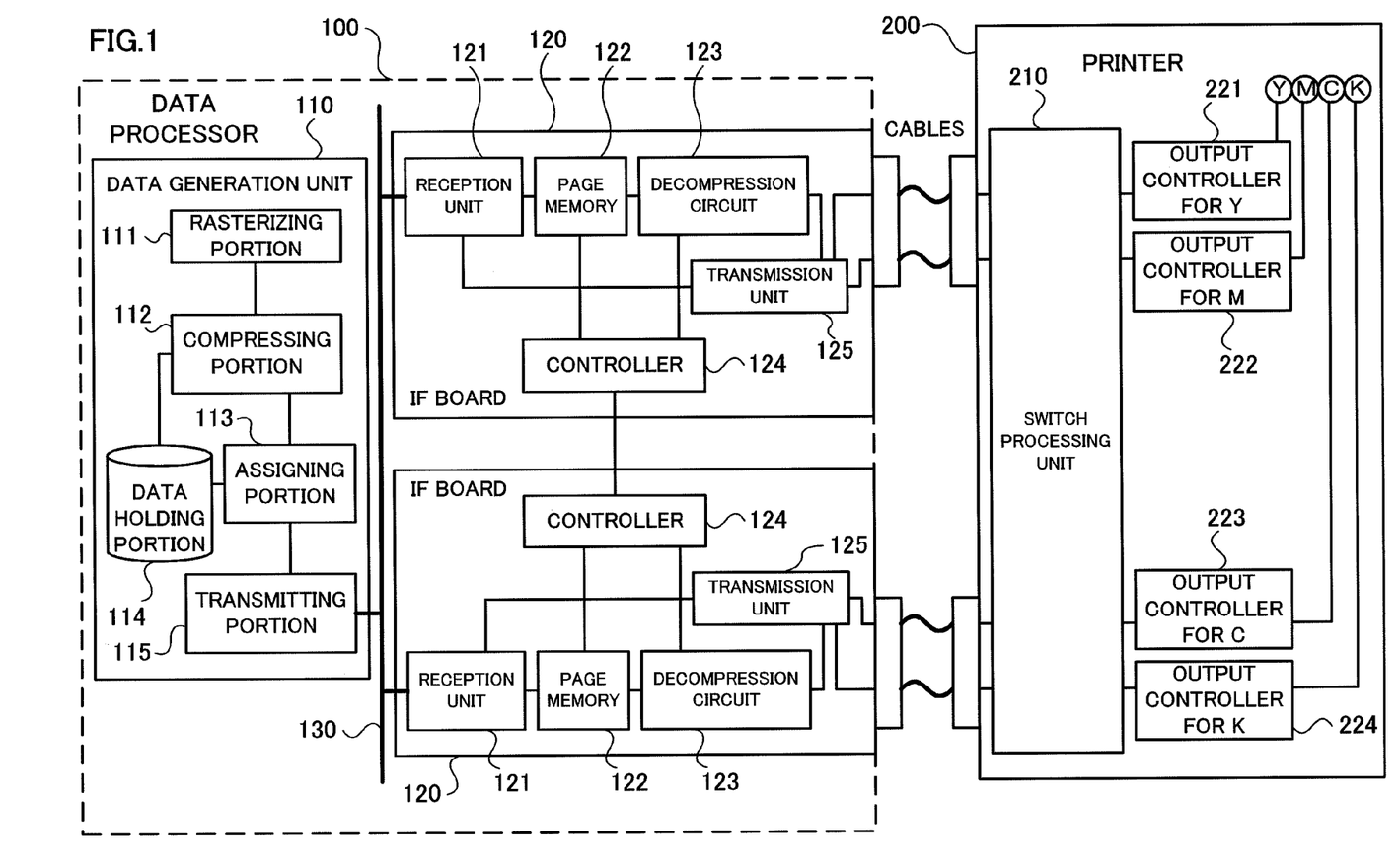
FIG. 1 is a diagram showing an overall configuration of an image forming system to which the present exemplary embodiment is applied.

FIG. 1 is a diagram showing an overall configuration of an image forming system to which the present exemplary embodiment is applied.

As shown in FIG. 1, the image forming system of the present exemplary embodiment includes a data processor 100 that generates image data of an image to be printed, and a printer 200 that forms the image on a medium such as paper according to image data generated by the data processor 100.

The data processor 100 includes a data generation unit 110 that generates image data, and interface boards (IF boards) 120 being data transfer units that transfer data to the printer 200. The data generation unit 110 and the IF boards 120 are connected via a bus 130 such as a PCI (Peripheral Component Interconnect) bus. A single IF board 120 handles data for two colors among four pieces of image data corresponding to yellow (Y), magenta (M), cyan (C) and black (K) to be handled by the printer 200. Accordingly, as shown in FIG. 1, the two IF boards 120 are connected to the data generation unit 110. The IF boards 120 are mutually connected, and allowed to directly transmit and receive control information therebetween.

As shown in FIG. 1, the two IF boards 120 are provided in the present exemplary embodiment. In order to secure a sufficient transfer rate (band), a cable for each of the colors Y, M, C and K is used for data transfer between the data processor 100 and the printer 200, and the cable needs to be at least thick enough to perform the data transfer. This also requires a connector at least large enough to connect the cables to the IF board 120, and this makes it physically difficult to mount a connector for cables of four colors Y, M, C and K on a single IF board 120. For this reason, generally, cables for two colors (two cables) are connected to each of two IF boards 120, or a cable for one color (one cable) is connected to each of four IF boards 120. The present exemplary embodiment employs the configuration where two cables are connected to each of the two IF boards 120. Hereinbelow, when the two IF boards 120 need to be distinguished from each other, the IF boards 120 will be described as IF board 120a and IF board 120b with the suffixes added thereto. Components of the IF board 120 to be mentioned later will be described in the same way.

The data generation unit 110 includes a rasterizing portion 111, a compressing portion 112, an assigning portion 113, a data holding portion 114, and a transmitting portion 115. Among these functions, the data holding portion 114 is implemented by a storage such as a hard disk drive (HDD). Other functions are implemented by a program-controlled CPU, a dedicated processor, and a memory such as a RAM, for example. The program for controlling the CPU is held in a nonvolatile memory such as a ROM.

The rasterizing portion 111 obtains document data (a Postscript file, a PDF file or the like) to be printed and rasterizes the data page by page, to generate raster data (single-color images) of the respective colors of Y, M, C and K. Hereinafter, to simplify the description, these single-color images of raster data including K (black) are referred to as color image components (the same reference is used for the raster data compressed by a later-described compressing portion 112). An existing RIP (Raster Image Processor), for example, is used as the rasterizing portion 111.

The compressing portion 112 compresses raster data (page data) of respective color image components for each page, generated by the rasterizing portion 111. The compressing portion 112 uses, for example, a lossless compression method such as the run length encoding as the method for compression. The compressing portion 112 also extracts information on the compression state while performing raster data compression, and generates a compression profile. Information on the compression state refers to the compression rate of compressed data or the data size after compression. The compression profile is generated in units of a predetermined number of pages, or generated in job units. The compression profile may be generated after completion of the raster data compression, or may be generated along with the compression processing. The compressed data and the compression profiles of all the color image components are temporarily held in the data holding portion 114.

The assigning portion 113 determines which pair of color image components among Y, M, C and K are to be transmitted by each of the IF boards 120a and 120b, and assigns the determined color image components to the IF boards 120a and 120b. Then, the assigning portion 113 outputs the information on the determined assignment of the color image components (assignment information). The assignment of the color image components is determined on the basis of the data amounts of the respective color image components. For this purpose, the assigning portion 113 reads the compression profiles generated by the compressing portion 112, from the data holding portion 114, and refers to the profiles. Although details will be described later, the assigning portion 113 assigns the color image components to the IF boards 120a and 120b to minimize a difference between the data amounts of the color image components held in page memories (later described) of the IF boards 120a and 120b. In this way, the page memories of the IF boards 120a and 120b may be used equally and efficiently.

The transmitting portion 115 reads the data compressed by the compressing portion 112 from the data holding portion 114, and transmits the data to the IF boards 120a and 120b in accordance with the assignment determined by the assigning portion 113. In addition, the transmitting portion 115 transmits the assignment information, outputted from the assigning portion 113, to both of the IF boards 120a and 120b.

The IF board 120 includes a reception unit 121, a page memory 122, a decompression circuit 123, a controller 124 and a transmission unit 125. For example, a RAM is used as the page memory 122. The decompression circuit 123 and the controller 124 are implemented by a program-controlled CPU (Central Processing Unit), FPGA (Field Programmable Gate Array), a dedicated processor implemented by ASIC (Application Specific integrated Circuit) on the IF board 120, for example.

The reception unit 121 receives data transmitted from the transmitting portion 115 of the data generation unit 110, transmits the compressed raster data to the page memory 122, and transmits the assignment information to the transmission unit 125. The compressed raster data is temporarily held in the page memory 122.

The page memory 122 has a sufficient storage capacity (of generally 512 MB or more) for continuously supplying data to the printer 200. Thereby, the time required for the processing by the rasterizing portion 111 of the data generation unit 110 is gained. As a result, continuous printing is achieved.

The decompression circuit 123 reads data held in the page memory 122 and decompresses the data to obtain the original raster data.

The controller 124 controls each of the above-mentioned functions. In addition, the controller 124 communicates and thus cooperates with a controller 124 of the other IF board 120, so that raster data of the respective color image components Y, M, C and K are transferred to the printer 200 appropriately in synchronization with each other, according to the assignment information from the assigning portion 113.

Under control of the controller 124, the transmission unit 125 transmits the raster data decompressed by the decompression circuit 123, to the printer 200. Additionally, the transmission unit 125 transmits the assignment information received from the reception unit 121, to the printer 200.

The printer 200 includes a switch processing unit 210 and output controllers 221 to 224. Since the printer 200 forms a full-color image by superimposing four single-color images of Y, M, C and K on one another, the output controllers 221 to 224 are configured of an output controller 221 for Y, an output controller 222 for M, an output controller 223 for C, and an output controller 224 for K. Moreover, although not particularly shown in the figure, the printer 200 is provided with an image forming mechanism that forms an image by use of image forming materials (toner or the like) of the respective colors of Y, M, C and K under control of the output controllers 221 to 224, and a transportation mechanism that transports a medium and discharges the medium after the image is formed thereon.

The switch processing unit 210 receives the raster data and the assignment information of the color image components respectively transmitted through four cables from the data processor 100. Then, each piece of the raster data received through the respective cables is transmitted to one of the output controllers 221 to 224 corresponding to the color of the color image components, in accordance with the assignment information. In other words, according to the assignment information, the switch processing unit 210 switches the paths that connect the output controllers 221 to 224 to the connectors of the cables through which pieces of data are transmitted. Incidentally, the path switching function of the switch processing unit 210 is implemented, for example, by use of an existing technique such as that described in Japanese Patent Application Laid Open Publication No. 2004-287520.

The output controllers 221 to 224 control image forming units of corresponding colors, in accordance with the raster data received from the switch processing unit 210, and thereby causing the image forming units to form the images of the respective colors by use of the image forming materials.

<Exchange of Data (Color Image Components)>

As described above, the page memory 122 is provided to each of the IF boards 120 to complement the slow processing speed of the rasterizing portion 111 of the data generation unit 110. However, the compressing portion 112 of the data generation portion 110 does not always compress the raster data of all the color image components at the same compression rate. Hence, in some cases, the page memory 122 may not be used efficiently.

For example, a text portion using the color K has almost no change in gradation, and accordingly may be compressed at an extremely high compression rate. In contrast, since a picture or graphics portion using the colors Y, M and C has frequent changes in gradation, only a low compression rate is achieved. In addition, in some cases, a particular image or a particular content of a print job (to print an image composed of two or more pages) requires different compression rates to be used for the respective colors of Y, M and C. In this case, the use efficiency of the page memory 122 is decreased, so that the output performance of the entire system is lowered.

In this regard, in the present exemplary embodiment, the color image components are assigned to each of the IF boards 120a and 120b according to the data size of the color image components after compression, so that the page memories 122 of the respective IF boards 120 are used as evenly as possible. In this way, the present exemplary embodiment improves the use efficiency of the page memory 122 and thus prevents deterioration in the output performance of the system.

Figure 2A:
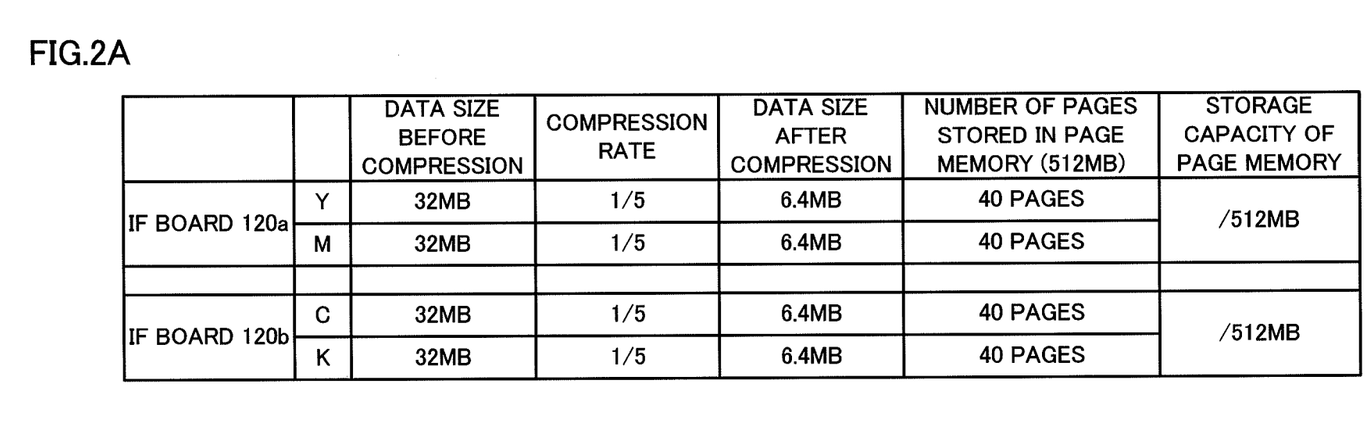
FIGS. 2A and 2B each shows a table of a usage example of the page memories in the IF boards.
Figure 2B:
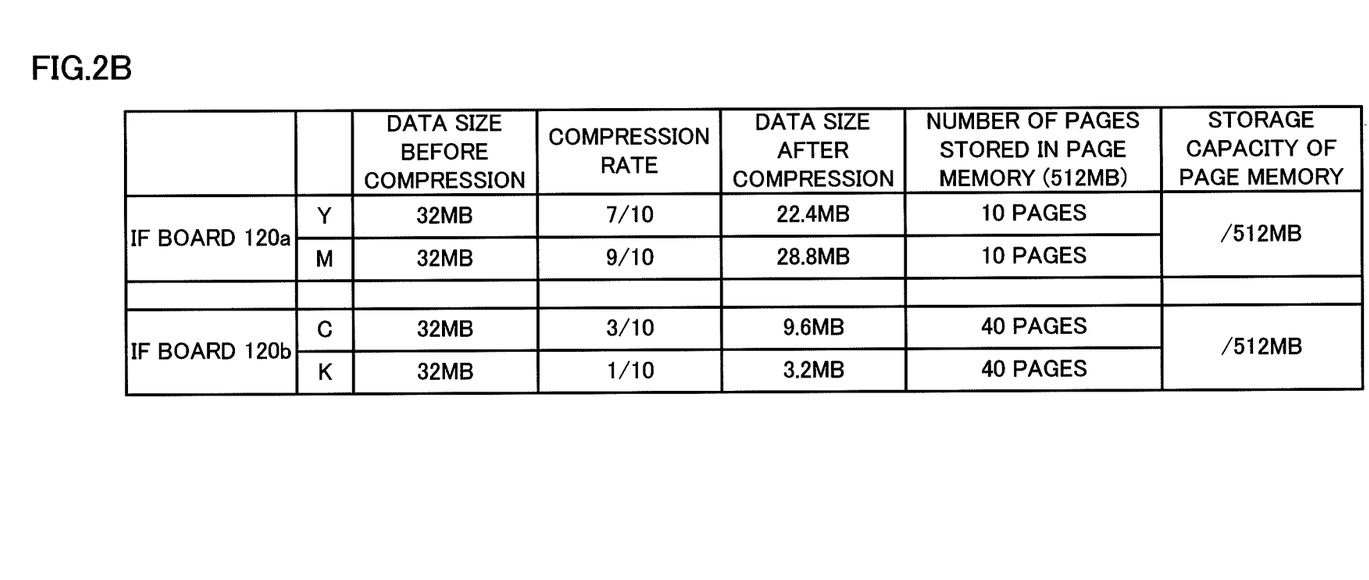

An explanation will be given by taking specific examples. FIGS. 2A and 2B each shows a table of a usage example of the page memories 122 in the IF boards 120. FIG. 2A is a case where the same compression rate of raster data is used for each color image components, and FIG. 2B is a case where the different compression rates of raster data are used for the respective color image components. Here, assume that the data size before compression is 32 MB (a page in A4 size) and that the storage capacity of the page memory 122 is 512 MB. In addition, assume that the IF board 120a handles data of the two colors Y and M, and the IF board 120b handles data of the two colors C and K.

In the example of FIG. 2A, for all the four colors Y, M, C and K, the compression rate is 1/5, and the data size after compression is 6.4 MB. Accordingly, the page memory 122 of 512 MB stores the data for 40 pages each for two color image components (80 pages in total).

Meanwhile, in the example of FIG. 2B, the different compression rates, that is, 7/10, 9/10, 3/10 and 1/10, are used for the colors Y, M, C and K, respectively. In addition, the data sizes after compression are 22.4 MB, 28.8 MB, 9.6 MB and 3.2 MB, respectively. In this case, the IF board 120b handling the two colors C and K may store data for 40 pages each for the two colors. However, the IF board 120a handling the two colors of Y and M may only store data for 10 pages each for the two colors. Here, the two IF boards 120 transfer data in synchronization with each other. For this reason, even if the data for 40 pages each are stored in the IF board 120b, only the data for 10 pages are ready to be printed for all the color image components. As a result, only the 10 pages are actually continuously printed out.

Figure 3A:
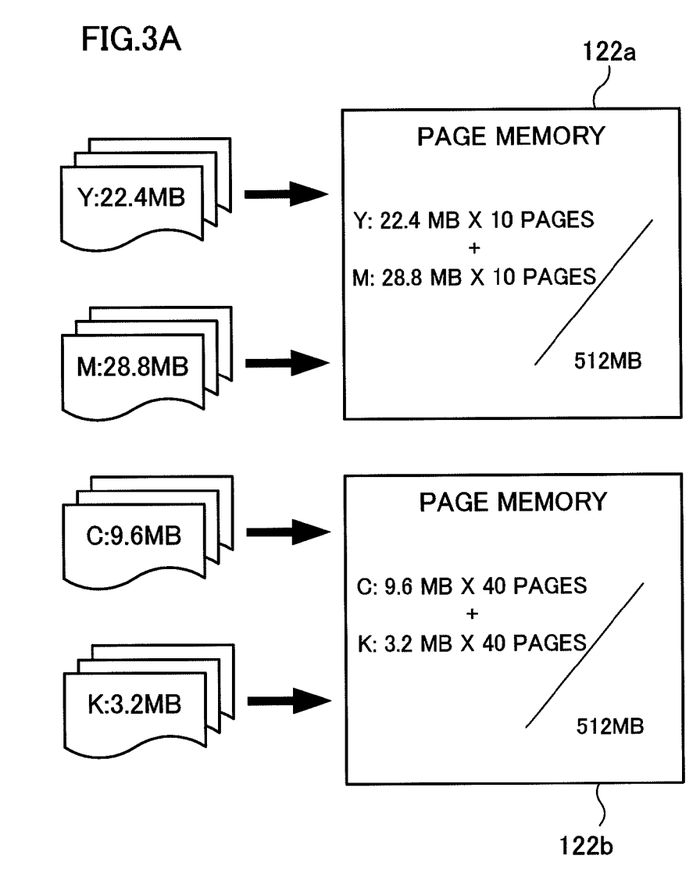
FIGS. 3A and 3B are diagrams for describing the concept of exchanging color image components.
Figure 3B:
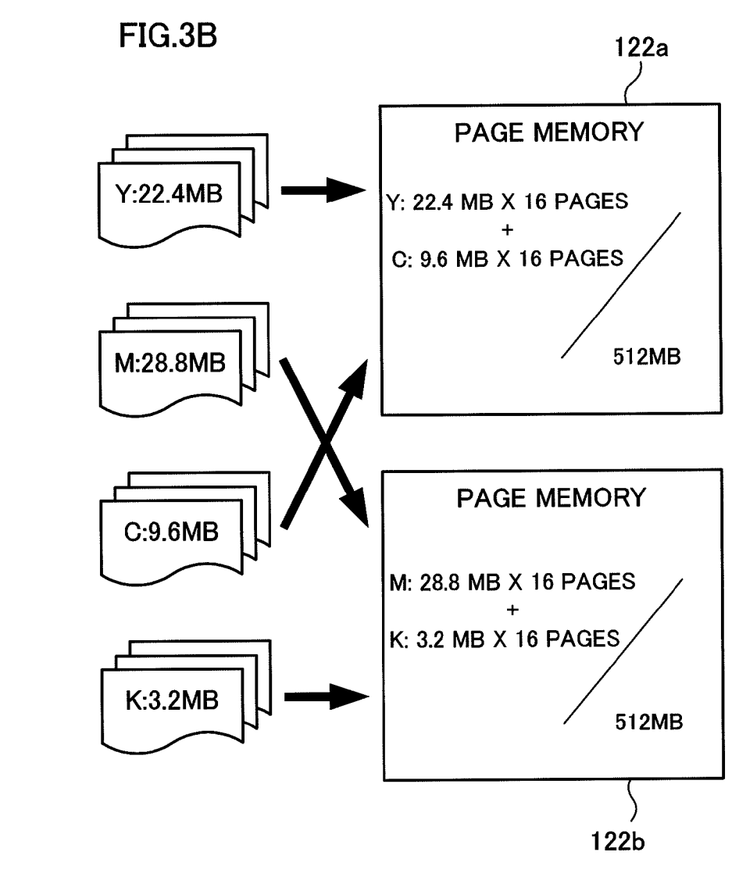

FIGS. 3A and 3B are diagrams for describing the concept of exchanging color image components.

FIG. 3A corresponds to the state of FIG. 2B, where the color image components of Y and M are transmitted to the IF board 120a, while the color image components of C and K are transmitted to the IF board 120b. The storage capacity of the page memories 122a and 122b of the respective IF boards 120a and 120b is 512 MB. Thus, the data for 10 pages each for the two color image components Y and M are stored in the page memory 122a, and the data for 40 pages each for the two color image components C and K are stored in the page memory 122b.

Here, the color image components handled by the IF boards 120a and 120b are exchanged, so that the color image components of Y and C are transmitted to the IF board 120a, and the color image components of M and K are transmitted to the IF board 120b, as shown in FIG. 3B. With this exchange, the data for 16 pages each for the two color image components are stored in each of the IF boards 120a and 120b. In the case of FIG. 3A, only 10 pages are continuously printed regardless of the number of pages stored in the page memory 122b, since only 10 pages each for the two color image components are stored in the page memory 122a. Meanwhile, in the case of FIG. 3B, 16 pages are continuously printed out. Accordingly, the use efficiency of the page memories 122a and 122b is higher when the color image components handled by the IF boards 120a and 120b are exchanged as in FIG. 3B, than otherwise.

By using specific data, an explanation will be given for a method for assigning color image components to the IF boards 120.

Figure 4:
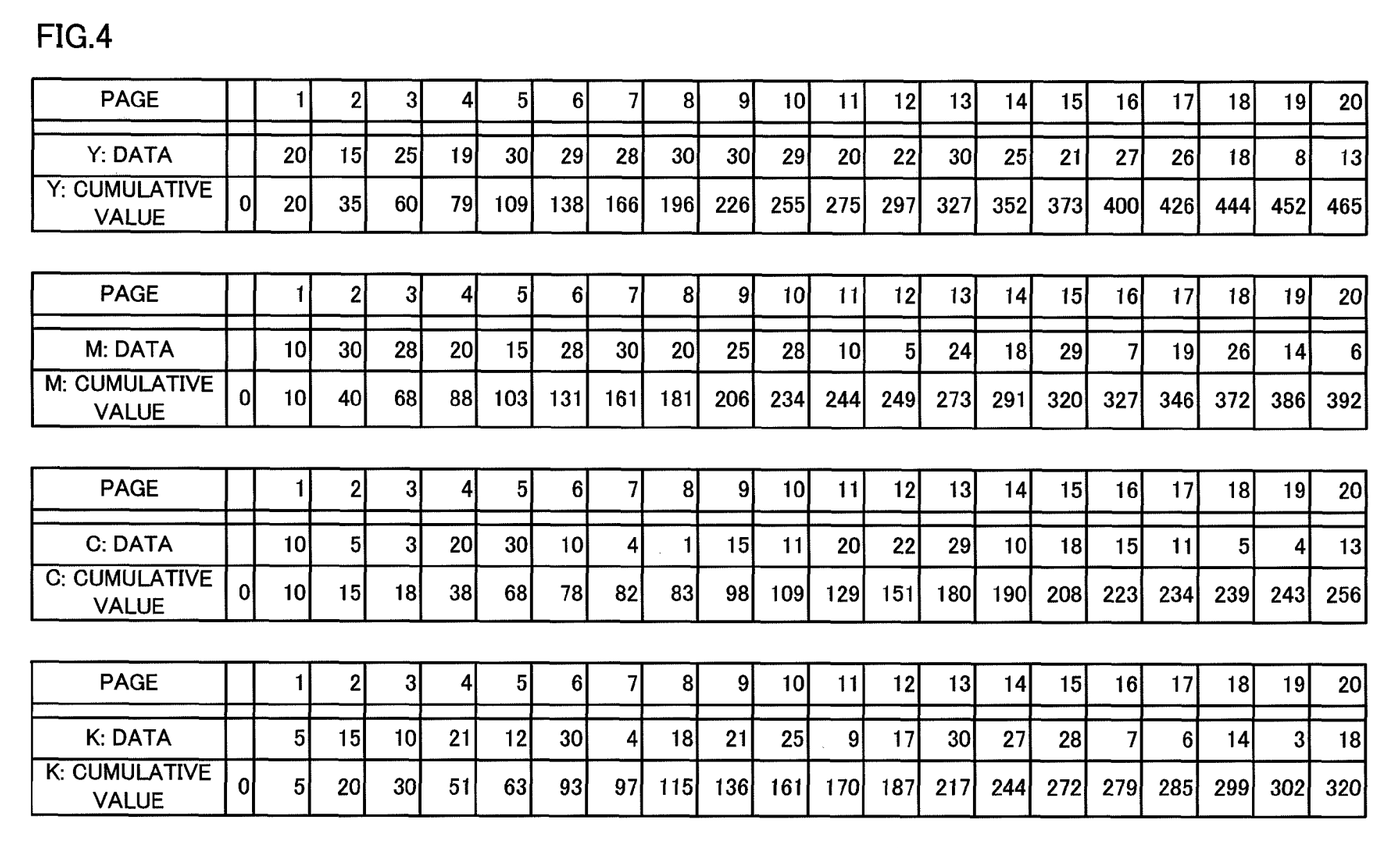
FIG. 4 shows tables each including an example of size for every page of compressed raster data of one color, and the cumulative values of the size.
Figure 5:
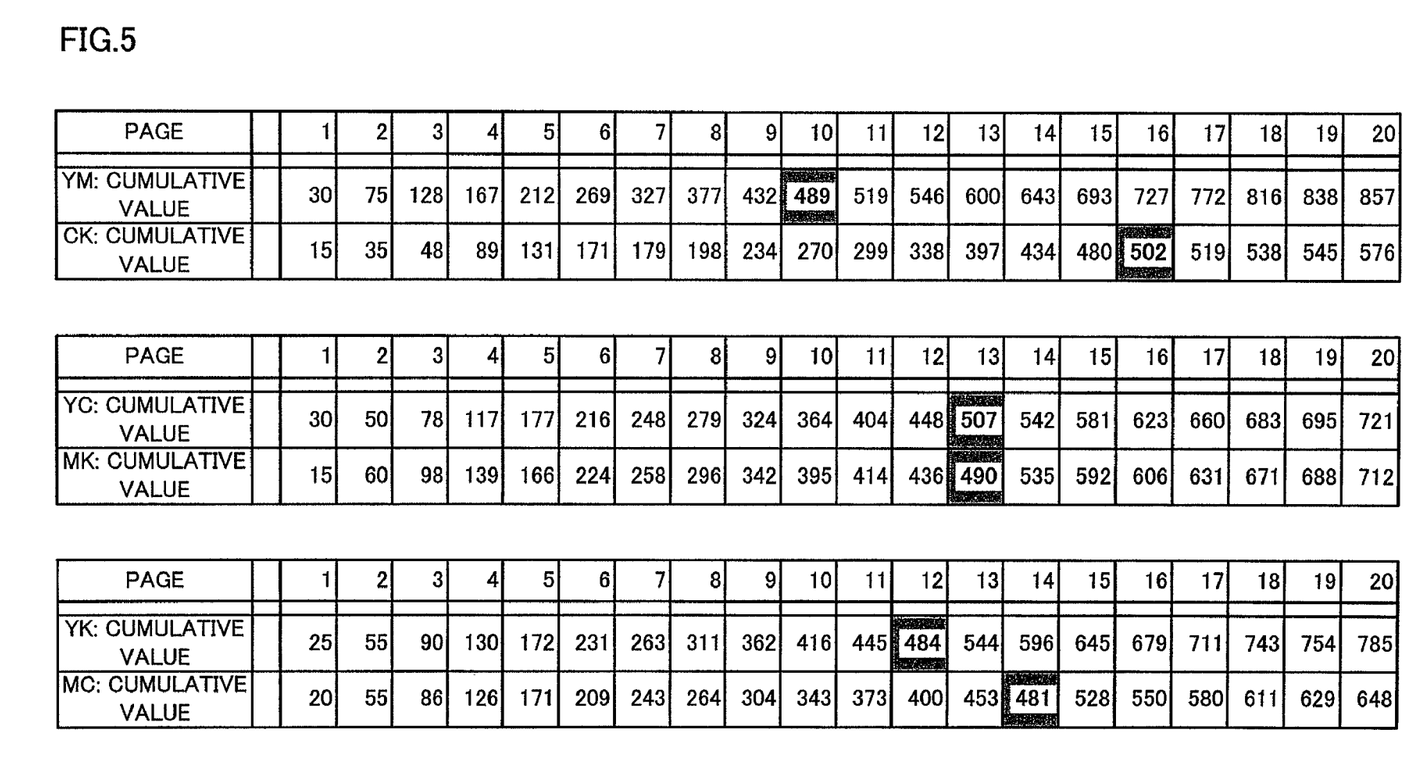
FIG. 5 shows tables each including values obtained by adding up the cumulative values, shown in FIG. 4, of combinations of two colors.

FIG. 4 shows tables each including an example of size for every page of compressed raster data of one color, and the cumulative values of the size. FIG. 5 shows tables each including values obtained by adding up the cumulative values, shown in FIG. 4, of combinations of two colors. In FIG. 5, cells including the cumulative values of the number of pages having the maximum data amount within 512 MB are shown in a shaded manner.

The combinations of two colors are: a combination of assigning the color image components Y and M to one of the IF boards 120 and assigning the color image components C and K to the other (referred to as a YM/CK configuration); a combination of assigning the color image components Y and C to one of the IF boards 120 and assigning the color image components M and K to the other (referred to as a YC/MK configuration); and a combination of assigning the color image components Y and K to one of the IF boards 120 and assigning the color image components M and C to the other (referred to as a YK/MC configuration).

In the page memory 122, pieces of data for two colors are accumulatively held within the range of the storage capacity (512 MB) of the page memory 122. As shown in FIG. 5, in the case of the YM/CK configuration, the IF board 120 assigned the color image components Y and M is capable of holding 10 pages each for the two color image components, while the IF board 120 assigned the color image components C and K is capable of holding 16 pages each for the two color image components (within 512 MB, the same condition is applied in the following cases). In the case of the YC/MK configuration, both of the IF boards 120 hold 13 pages each for the two color image components. In addition, in the case of the YK/MC configuration, the IF board 120 assigned the color image components Y and K is capable of holding 12 pages each for the two color image components, while the IF board 120 assigned the color image components M and C is capable of holding 14 pages each for the two color image components.

Since the two IF boards 120 transfer data in synchronization with each other as described above, the number of continuously printable pages is determined in accordance with a smaller number of held pages. Accordingly, the number of continuously printable pages is 10 pages in the YM/CK configuration, 13 pages in the YC/MK configuration, and 12 pages in the YK/MC configuration. In other words, in the YM/CK configuration, a storage capacity for 6 pages is wasted in the IF board 120 assigned the color image components C and K. Similarly, in the YK/MC configuration, a storage capacity for 2 pages is wasted in the IF board 120 assigned the color image components M and C. Meanwhile, in the YC/MK configuration, all the pages stored in the page memories 122 of both of the IF boards 120 are continuously printable, and hence the page memories 122 are used most efficiently.

Moreover, the smaller one of the numbers (equal numbers in the case of FIG. 5) of pages held in the two page memories 122 of the respective IF boards 120, that is, the number of continuously printable pages is maximum in the YC/MK configuration among the above three configurations. Accordingly, the system is to exert the highest printing performance in the case of the YC/MK configuration.

As has been described, the use efficiency of the page memory 122 is improved by equalizing the usage amount of the two page memories 122 of the respective IF boards 120 as much as possible, that is, by minimizing the difference between the data amount stored in the page memories 122. The efficient use of the page memory 122 prevents the number of continuously printable pages from decreasing, which contributes to avoiding deterioration in the printing performance of the whole system.

On the basis of the above-described concept of exchanging color image components, the assigning portion 113 assigns each of the color image components to one of the IF boards 120a and 120b so that the difference between the data amounts stored in the page memories 122a and 122b may be minimized. The data amounts to be stored in the page memories 122a and 122b are determined in consideration of the compression rate or size of compressed data of each color print, both of which are described in the compression profiles. In order to accommodate variations in the compression rate of individual pages, the data amount determination is made on the basis of cumulative values for some pages as explained in reference to FIGS. 4 and 5, instead of the compression rate or size of compressed data for each page.

At any timing such as every page or every predetermined number of pages, a determination may be made as to whether or not to change the assignment of the color image components to the IF boards 120a and 120b. Note that a change in the assignment of the color image components may not be particularly effective if the configuration of the assignment of the color image components at a time of the determination produces only a small difference between the data amounts stored in the page memories 122a and 122b, even though not being the best one. Accordingly, the assigning portion 113 determines to change the assignment on condition that the difference between the data amounts stored in the page memories 122a and 122b is equal to or greater than a certain value (such as when exceeding 100 MB), for example.

The actual process of assigning the color image components to the IF boards 120a and 120b is performed at any set timing such as every predetermined number of pages or every print job. The assignment of the color image components may be changed during the execution of the print jobs. In this case, the data of the color image components stored in the page memories 122a and 122b are sequentially transferred to the printer 200 according to the current assignment. After that, when a certain amount of free spaces or more become available in the page memories 122a and 122b, the subsequent data of the color image components are sequentially stored in the page memories 122a and 122b according to the new assignment of the color image components. Then, upon output of all the data of the color image components according to the current assignment, the settings of the IF boards 120a and 120b and the setting of the switch processing unit 210 of the printer 200 are changed, while data are continuously transferred from the page memories 122a and 122b to the printer 200. In this way, even in a case where the setting of assignment of the color image components to the IF boards 120a and 120b is changed in the middle of a print job, or a case where print jobs with different settings are executed in succession, the printer 200 continuously outputs prints without having to temporarily stop outputting for change of settings.

<Operation of Data Processor 100>

Next, a description will be given for an operation of the data processor 100 including an exchange of raster data as described above.

Figure 6:
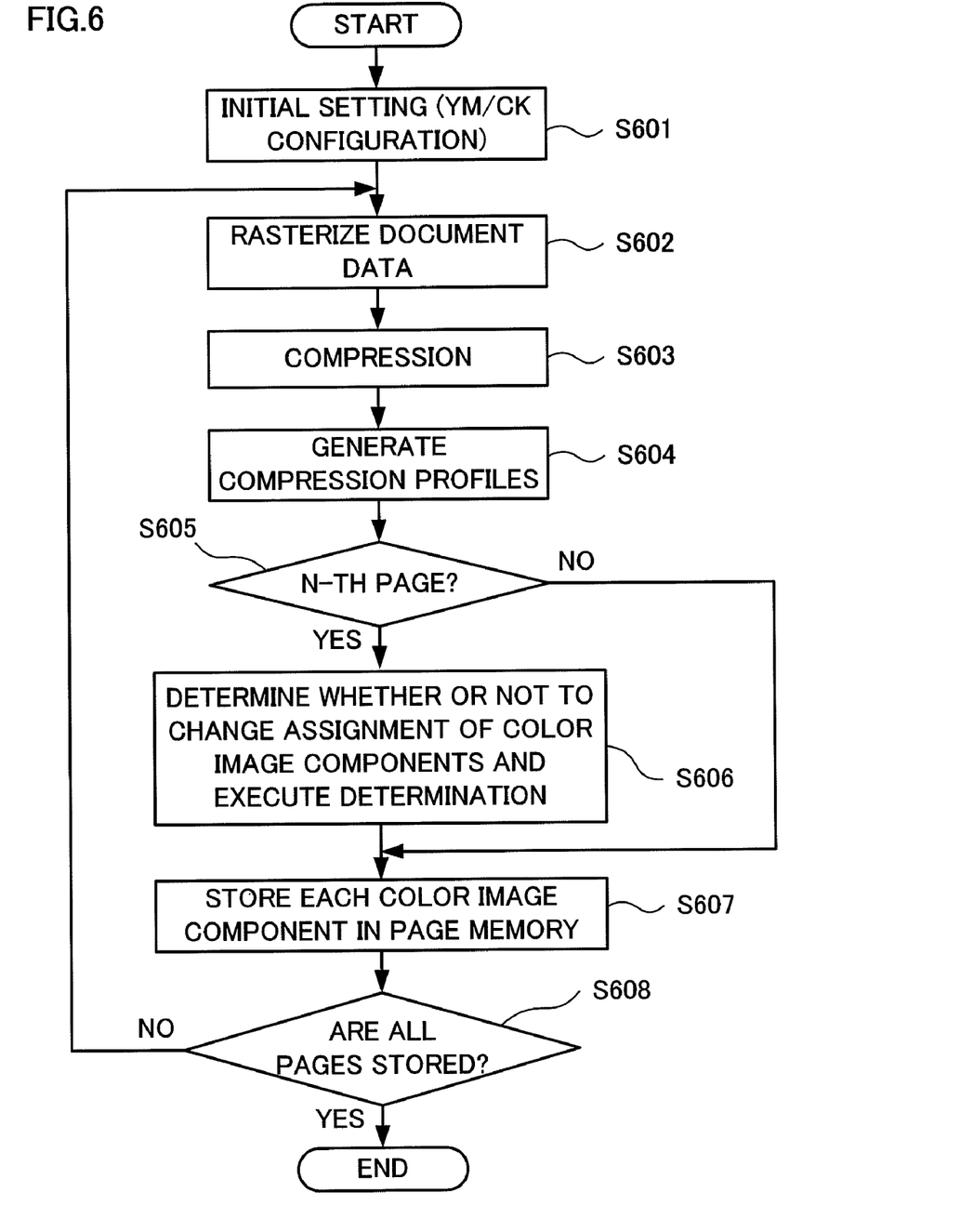
FIG. 6 is a flowchart illustrating an operation of the data processor for storing data to be printed in the page memories of the IF boards.

FIG. 6 is a flowchart illustrating an operation of the data processor 100 for storing data to be printed in the page memories 122a and 122b of the IF boards 120a and 120b.

In the operation example shown in FIG. 6, the assigning portion 113 is assumed to execute processing for every preset number of pages (N pages). In addition, as the initial setting, the YM/CK configuration is set for the assignment of the color image components to the IF boards 120a and 120b (step 601).

When the print job is started, the rasterizing portion 111 of the data processor 100 firstly obtains document data to be printed, and rasterizes the data page by page for each color image component (step 602). Then, the compressing portion 112 compresses the rasterized data for each color image component (step 603), and generates the compression profiles (step 604). The compressed data are temporarily held in the data holding portion 114, and are sent to the IF boards 120a and 120b together with the compression profiles.

If the already-assigned pages have not yet reached the N-th page at this point (step 605: N), the data compressed in step 603 are stored in the page memories 122a and 122b of the IF boards 120a and 120b according to the current assignment setting (step 607).

In contrast, if the already-assigned pages have reached the N-th page (step 605: Y), the assigning portion 113 determines whether or not to change the assignment of the color image components to the IF boards 120a and 120b. If the assigning portion 113 determines to change the assignment (a case where the difference between the data amounts stored in the page memories 122a and 122b is equal to or greater than a certain amount, for example), the assigning portion 113 executes the assignment of the color image components. In contrast, if the assigning portion 113 determines not to change the assignment, the current setting is maintained (step 606). Thereafter, in accordance with this assignment, the data compressed in step 603 are stored in the page memories 122a and 122b of the IF boards 120a and 120b (step 607).

Subsequently, a determination is made as to whether or not all the pages to be printed are stored in the page memories 122a and 122b. If all the pages have not been stored yet (step 608: N), the processing returns to step 602 to process the subsequent pages. In contrast, if all the pages are stored in the page memories 122a and 122b (step 608: Y), the processing is terminated.

Upon storage of data in the page memories 122a and 122b of the IF boards 120a and 120b as described above, the controllers 124a and 124b of the IF boards 120a and 120b control the transmission units 125a and 125b, and cause the transmission units 125a and 125b to transmit the assignment information received from the data generation unit 110, to the printer 200. In addition, the controllers 124a and 124b cause the decompression circuits 123a and 123b to decompress raster data of each of the color image components, and cause the transmission units 125a and 125b to transmit the decompressed raster data to the printer 200, while synchronizing with each other through mutual communications. At this time, the raster data of each of the color image components are transferred in the order in which the image forming units for the respective colors are arranged in the printer 200 (usually in the order of Y, M, C and K). The controllers 124a and 124b may determine this order through an information exchange therebetween. Otherwise, the data generation unit 110 may be provided with a function of controlling the IF boards 120, and may specify the order by issuing an instruction to the controllers 124a and 124b.

In a normal existing system, an IF board 120 assigned the color image components Y and M serves as a master, and the other IF board 120 serves as a slave. However, since the color image components are assigned in various ways to the IF boards 120a and 120b in the present exemplary embodiment, the master-and-slave relation between the IF boards 120a and 120b varies dynamically depending on which color image components are assigned to each of the IF boards 120. The controllers 124a and 124b may determine the setting of master-and-slave relation through an exchange of information therebetween. Otherwise, the data generation unit 110 may be provided with a function of controlling the IF boards 120, and may specify the setting by issuing an instruction to the controllers 124a and 124b.

In the printer 200, when the assignment information is received from the data processor 100, the switch processing unit 210 switches the paths, if necessary, according to the assignment information. Then, when raster data of each of the color image components are transferred from the data processor 100, the raster data are transmitted to one of the output controllers 221 to 224 for a corresponding color, through a preset path, and an image of each color is formed by the image forming unit.

Figure 7:
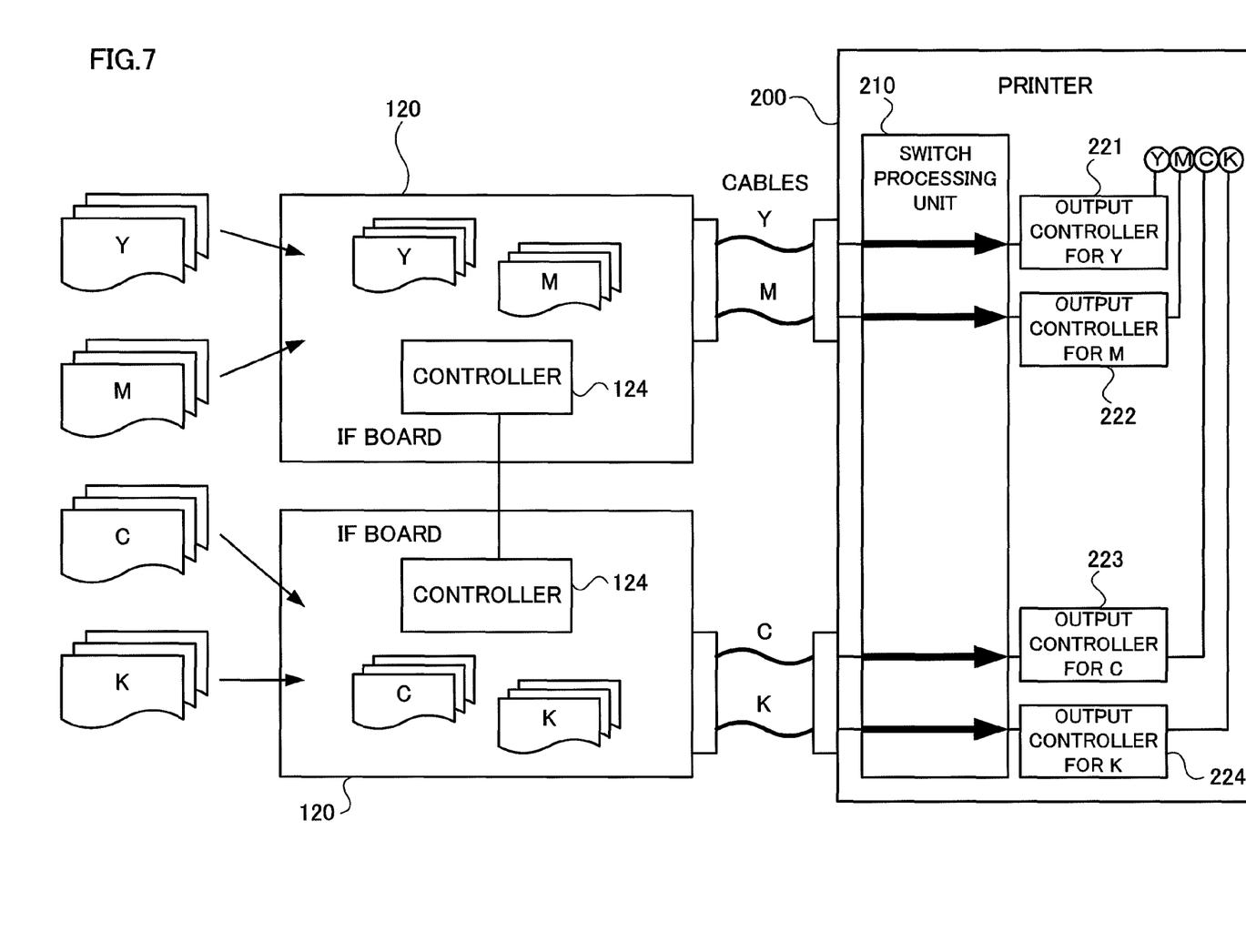
FIG. 7 is a diagram showing an initial state.
Figure 8:
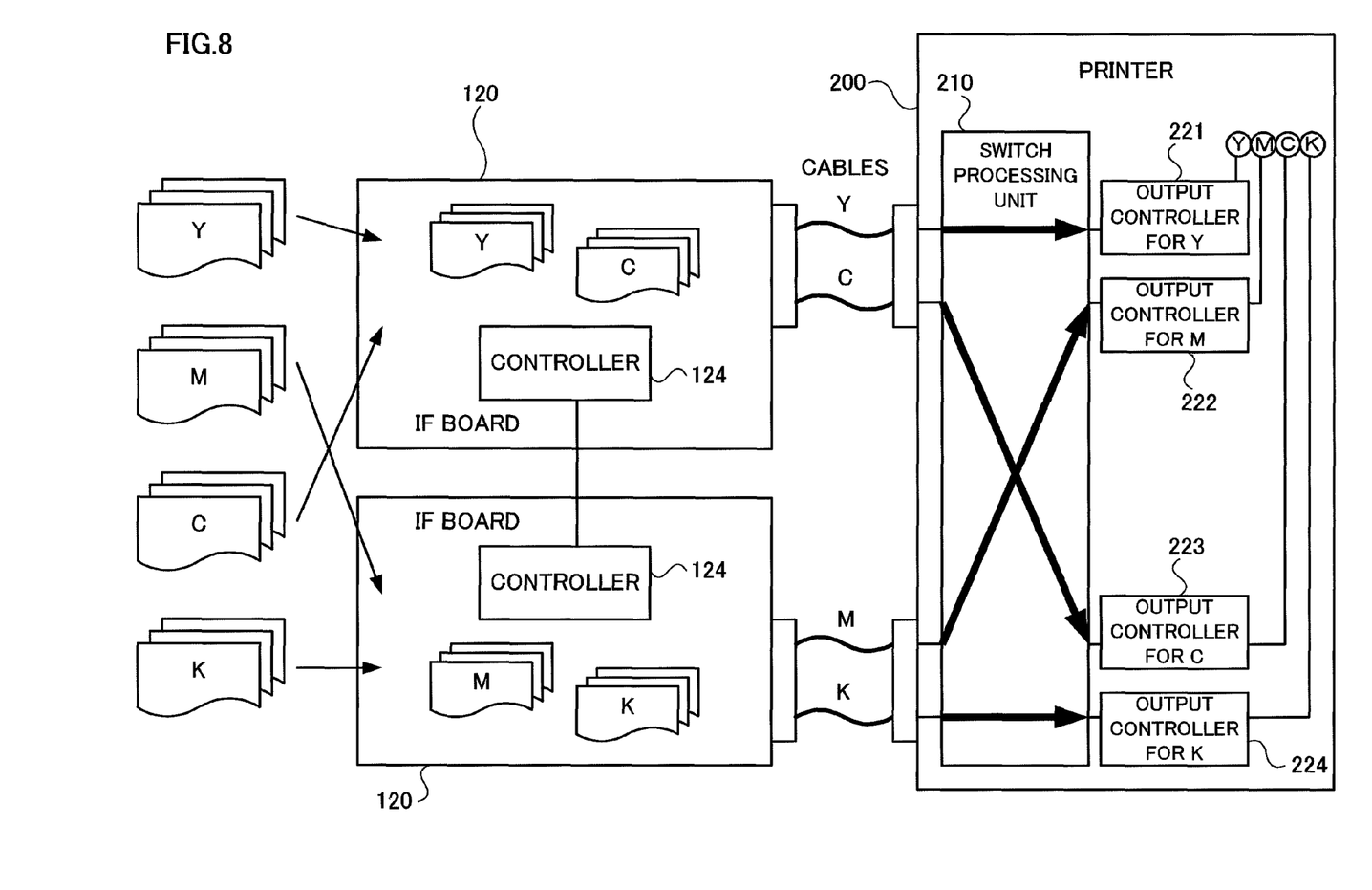
FIG. 8 is a diagram showing a state where the color image components C and M are exchanged.

FIGS. 7 and 8 are diagrams showing a state when setting of the path is changed by the switch processing unit 210.

FIG. 7 is a diagram showing an initial state. In the FIG. 7, the color image components of two colors Y and M are assigned to the IF board 120a, and the color image components of two colors C and K are assigned to the IF board 120b. In this case, the raster data of the color image components Y and M are transferred from the IF board 120a to the printer 200 through the cables, and the raster data of the color image components C and K are transferred from the IF board 120b to the printer 200 through the cables. As a result, the printer 200 receives, through the cables, the raster data of each of the color image components according to the setting by the switch processing unit 210, and the raster data of each of the color image components are supplied to one of the output controllers 221 to 224 for a corresponding color.

FIG. 8 is a diagram showing a state where the color image components C and M are exchanged. In FIG. 8, the color image components of two colors Y and C are assigned to the IF board 120a, and the color image components of two colors M and K are assigned to the IF board 120b. In this case, the raster data of the color image components Y and C are transferred from the IF board 120a to the printer 200 through the cables, and the raster data of the color image components M and K are transferred from the IF board 120b to the printer 200 through the cables. As a result, in the printer 200, the raster data of C and M among the raster data received through the cables are exchanged each other in comparison with the case of FIG. 7. Accordingly, the switch processing unit 210 switches the paths as shown in FIG. 8, and thereby makes a setting such that the raster data of the color image component C are appropriately supplied to the output controller 223 for C, and that the raster data of the color image component M are appropriately supplied to the output controller 222 for M.

In the above description, the switch processing unit 210 of the printer 200 autonomously sets the paths according to the assignment information received from the data processor 100. Instead of this, the assigning portion 113 of the data processor 100 may transmit an instruction to switch the paths to the switch processing unit 210, and the switch processing unit 210 may switch the paths in accordance with this instruction.

Figure 9:
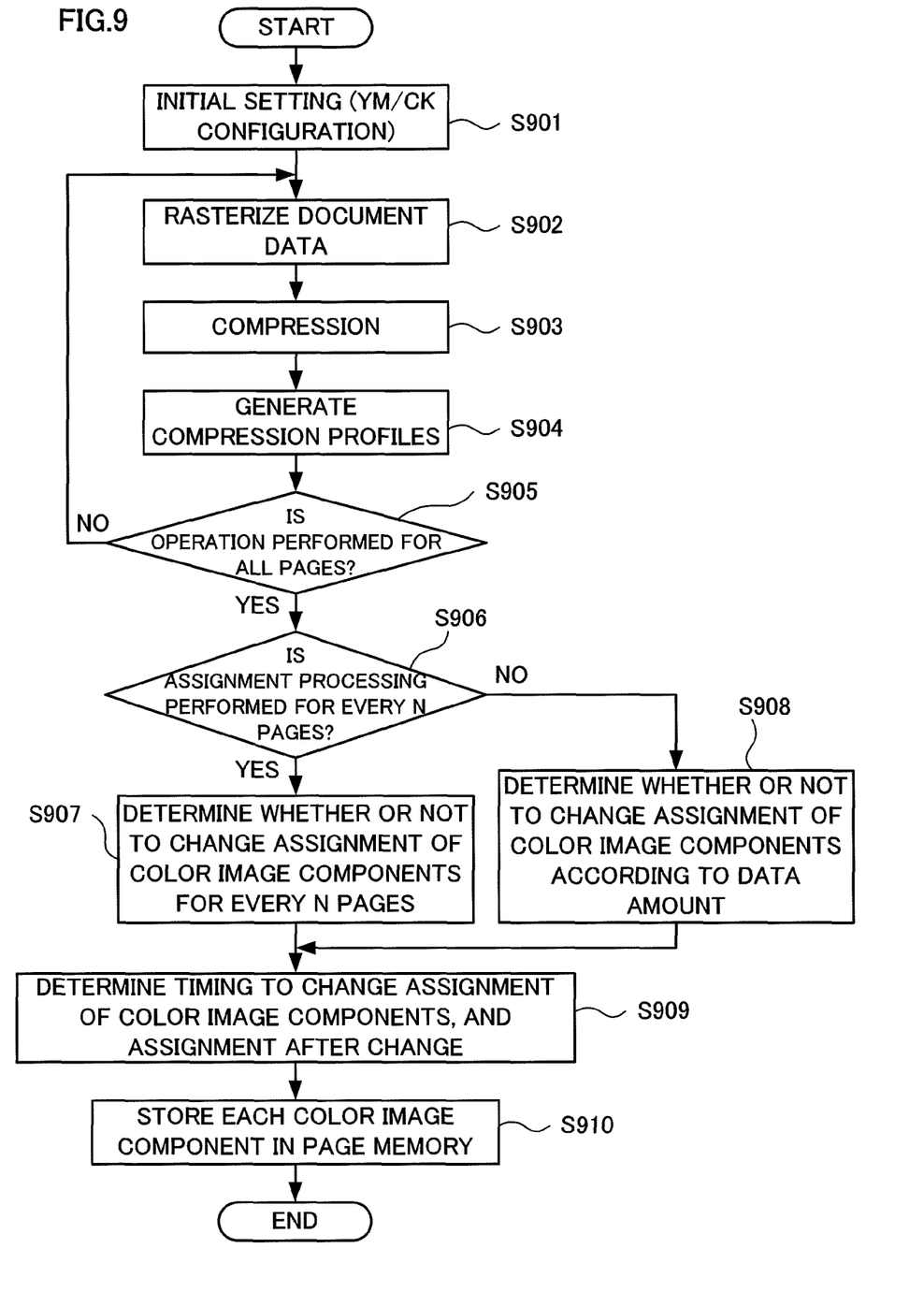
FIG. 9 is a flowchart illustrating another operation example of the data processor for storing data to be printed in the page memories of the IF boards.

FIG. 9 is a flowchart illustrating another operation example of the data processor 100 for storing data to be printed in the page memories 122a and 122b of the IF boards 120a and 120b.

In the operation example shown in FIG. 9, as the initial setting, the YM/CK configuration is also set for the assignment of the color image components to the IF boards 120a and 120b (step 901).

When the print job is started, the rasterizing portion 111 of the data processor 100 firstly obtains document data to be printed, and rasterizes the data page by page for each color image component (step 902). Then, the compressing portion 112 compresses the rasterized data for each color image component (step 903), and generates the compression profiles (step 904). The compressed and rasterized data and the compression profiles are held in the data holding portion 114. The operation from step 902 to 904 described above is performed for all pages to be printed in the print jobs. When the processing is finished, the step moves into the processing by the assigning portion 113 (step 905).

The assigning portion 113 performs processing of assigning the color image components to the IF boards 120 for every predetermined number of pages or in accordance with the usage status of the page memories 122 of the IF boards 120.

In the case of performing the assignment processing for every predetermined number of pages (step 906:Y), the compression profile for each of the color image components is referred to for every preset number of pages (N pages). Thereafter, the assigning portion 113 determines whether or not to change the assignment of the color image components to the IF boards 120a and 120b (step 907).

In the case of not performing the assignment processing for every predetermined number of pages (step 906: N), the assigning portion 113 determines whether or not to change the assignment of the color image components to the IF boards 120a and 120b, according to the data amount of each color image component held in the data holding portion 114, in reference to the compression profiles of the color image components (step 908). Specifically, the assigning portion 113 makes a determination when the data amount of at least one of the combinations of color image components assigned to the IF boards 120a and 120b reaches the storage capacity of the page memories 122a and 122b.

According to the determination made in the above step 907 or 908, the assigning portion 113 determines a timing (number of pages) to change the assignment of the color image components to the IF boards 120a and 120b and the assignment after the change (step 909). The assigning portion 113 transmits the color image components to the IF boards 120a and 120b in accordance with the determined assignment at the determined timing, and sequentially stores the color image components in the page memories 122a and 122b (step 910).

The operations of the data processor 100 and the printer 200 after the data are stored in the page memories 122a and 122b of the IF boards 120a and 120b are the same as those described above.

Note that, although the above exemplary embodiment has been described by taking as an example the case where four kinds of image forming materials (Y, M, C and K) are used in the printer 200 to form an image, and where two color image components are assigned to each of the two IF boards 120, the exemplary embodiment of the present invention is not limited to this configuration. For example, the exemplary embodiment of the present invention may be applied to a case where a printer using image forming materials of five or more kinds generates color image components corresponding to the five or more kinds of image forming materials. In this case, a configuration may be employed where color image components are assigned to three or more IF boards, or where color image components of three colors or more are assigned to a single IF board. In any of these cases, according to the compression rate and the size of the compressed data of each color image component, the assignment of color image components to each of the IF boards is appropriately changed to equally use the page memories of the IF boards.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   a printer that transfers a plurality of images to a medium while superposing the plurality of images formed by use of a plurality of image forming materials on one another; and
   a data processor that supplies data of the images to the printer,
   the data processor including:
      a data generation unit that generates data of image components corresponding to the respective kinds of the image forming materials;
      a plurality of data forwarding units that forward the generated data to the printer; and
      an assigning unit that assigns the image components of the data to be forwarded to the plurality of data forwarding units respectively in accordance with the data,
   the printer including:
      output controllers that each controls an image forming mechanism to form an image by use of the image forming materials; and
      a switch processing unit that transmits the data received from the data forwarding unit of the data processor, to one of the output controllers corresponding to the respective kinds of image components of the data.

2. The image forming system according to claim 1, wherein the plurality of the data forwarding units of the data processor each comprises a memory that holds data to be forwarded, and
   the assigning unit determines the assignment of the image components of the data to the plurality of data forwarding units so as to reduce the difference between the data amounts of the data held in the memories of the plurality of data forwarding units.

3. The image forming system according to claim 2, wherein the assigning unit determines the assignment of the image components of the data to the plurality of data forwarding units any one of every data amount unit and every print job unit.

4. The image forming system according to claim 2, wherein the assigning unit changes the assignment of the image components of the data to the respective data forwarding units in a case where the difference between sizes of the data held in the memories of the plurality of data forwarding units is equal to or surpasses a certain amount.

5. The image forming system according to claim 2, further comprising a compressing unit that compresses the data of the image components generated by the data generation unit, wherein
   the assigning unit determines the data amount of the data to be held in each of the memories of the data forwarding units, in accordance with the compression rate of each data of the image component compressed by the compressing unit.

6. The image forming system according to claim 1, wherein the data generation unit of the data processor generates the data to be forwarded in page units;
   the data forwarding units of the data processor each comprises a memory that holds data to be forwarded; and
   the assigning unit determines the assignment of the image components of the data to the plurality of data forwarding units so as to maximize the smallest number of pages included in the data held in the memories of the plurality of data forwarding units.

7. A data processor comprising:
   a data generation unit that generates page data of image components respectively corresponding to kinds of image forming materials used in a printer;
   a plurality of data forwarding units that each holds the generated page data in a page memory thereof, and forwards the page data held in the page memory to the printer; and
   an assigning unit that assigns the image components of the page data to be forwarded to each of the plurality of data forwarding units in accordance with the page data amount of the page data held in the respective page memories of the data forwarding units, and notifies the printer of information on the image components of the page data assigned to the respective data forwarding units.

8. The data processor according to claim 7, wherein the assigning unit determines the assignment of the image components to the plurality of data forwarding units so as to reduce the difference between the page data amounts of the page data held in the page memories of the plurality of data forwarding units.

9. The data processor according to claim 7, wherein the assigning unit determines the assignment of the image components to the plurality of data forwarding units so as to maximize the smallest number of pages included in the page data held in the page memories of the plurality of data forwarding units.

10. A data processing method comprising:
    generating page data of image components respectively corresponding to kinds of image forming materials used in a printer;
    holding the generated page data in page memories, and forwarding the page data held in the page memories to the printer; and
    assigning the image components to be forwarded in accordance with the page data amount of the page data held in the page memories, and notifying the printer of information on the assigned image components.

* * * * *